(12) United States Patent
Buckley et al.

(10) Patent No.: US 11,041,570 B1
(45) Date of Patent: Jun. 22, 2021

(54) VALVE ASSEMBLY FOR HYDRAULIC FRACTURING PUMP

(71) Applicant: ST9 Gas and Oil, LLC, The Woodlands, TX (US)

(72) Inventors: Christopher Paul Buckley, Montgomery, TX (US); Brian Boguski, Milford, OH (US)

(73) Assignee: ST9 Gas and Oil, LLC, The Woodlands, TX (US)

( * ) Notice: Subject to any disclaimer, the term of this patent is extended or adjusted under 35 U.S.C. 154(b) by 0 days.

(21) Appl. No.: 16/805,438

(22) Filed: Feb. 28, 2020

(51) Int. Cl.
| | |
|---|---|
| *F16K 1/54* | (2006.01) |
| *F16K 15/02* | (2006.01) |
| *E21B 43/26* | (2006.01) |
| *F04B 53/10* | (2006.01) |
| *F16K 1/38* | (2006.01) |

(52) U.S. Cl.
CPC .............. *F16K 1/54* (2013.01); *F16K 15/023* (2013.01); *E21B 43/26* (2013.01); *F04B 53/10* (2013.01); *F16K 1/385* (2013.01)

(58) Field of Classification Search
CPC .......... F16K 1/54; F16K 1/385; F16K 15/023; E21B 43/26; F04B 53/10
USPC .................................................... 137/543.23
See application file for complete search history.

(56) References Cited

U.S. PATENT DOCUMENTS

| | | | | |
|---|---|---|---|---|
| 1,705,800 A | * | 3/1929 | Akeyson | ............. F04B 53/1022 251/332 |
| 2,260,381 A | * | 10/1941 | Kennon | ................... F16K 15/02 137/516.29 |
| 3,070,120 A | * | 12/1962 | Wendtalexm | ............. F16K 1/46 137/516.29 |
| 3,489,170 A | | 1/1970 | Leman | |
| 4,518,329 A | | 5/1985 | Weaver | |
| 5,052,435 A | | 10/1991 | Crudup et al. | |
| 5,088,521 A | | 2/1992 | Johnson | |
| 7,591,450 B1 | * | 9/2009 | Blume | ...................... F16K 1/34 251/332 |
| 8,074,679 B2 | * | 12/2011 | Jensen | .................... F04B 53/16 137/512 |
| 9,927,036 B2 | | 3/2018 | Dille | |
| 2013/0202457 A1 | * | 8/2013 | Bayyouk | ............... F04B 53/162 417/279 |
| 2016/0215588 A1 | | 7/2016 | Belshan et al. | |
| 2017/0002947 A1 | | 1/2017 | Bayyouk et al. | |

(Continued)

FOREIGN PATENT DOCUMENTS

WO   WO-2019060854 A1   3/2019

*Primary Examiner* — Jessica Cahill
*Assistant Examiner* — Patrick C Williams (57) ABSTRACT

A valve head assembly for a hydraulic fracturing pump. The valve head assembly includes a valve body attached to a valve leg assembly with backward swept or delta shaped legs. Each leg is attached to a main leg shaft which extends along a main axis. Each leg has a first leg segment and a second leg segment. The first leg segment has a first end that attaches to a distal end of the main leg shaft and extends along a first leg segment axis back towards the valve body. The second end of the first leg segment attaches to the second leg segment which extends along a second leg segment axis that is substantially parallel with but spaced apart from the main axis. The first leg segment may form an angle between the main axis and the first leg segment axis that is between approximately 10 and 60 degrees.

20 Claims, 8 Drawing Sheets

(56) References Cited

U.S. PATENT DOCUMENTS

| | | |
|---|---|---|
| 2017/0089470 A1 | 3/2017 | Filipow et al. |
| 2018/0298893 A1 | 10/2018 | Buckley |
| 2019/0316685 A1* | 10/2019 | Wang ..................... F04B 47/00 |

* cited by examiner

VALVE ASSEMBLY FOR HYDRAULIC FRACTURING PUMP

TECHNICAL FIELD OF THE INVENTION

The present application relates generally to a reciprocating pump, and in particular to a valve head assembly for use in suction or discharge valve assemblies of a pump fluid end.

BACKGROUND OF THE INVENTION

In the modern-day oil and gas industry, unconventional reservoir plays continue to maintain outsized importance. However, there are difficulties in economically producing hydrocarbons from low permeability rock formations. One way to boost production rates is using hydraulic fracturing, a technique that increases rock permeability by opening channels through which hydrocarbons can flow to recovery wells. During hydraulic fracturing, a hydraulic fracturing fluid is pumped into a formation under high pressure (sometimes as high as 50,000 psi) leading to fracturing of the formation to promote release of hydrocarbons. Often, large quantities of proppants are suspended in the hydraulic fracturing fluid and flow into the fractures during the pumping stage. When pressure on the hydraulic fracturing fluid is released and the hydraulic fracturing fluid is recovered from the wellbore, the fractures only partially close because the proppants have wedged within the fractures, leaving open channels for oil and gas to flow.

Specialized hydraulic fracturing pumps are used to deliver fracture fluids at sufficiently high rates and pressures to complete a hydraulic fracturing operation or "frac job." These pumps are usually provided with fluid ends that have reciprocating plungers to place fluids under pressure and valve assemblies that control fluid flow into and out of the pump. Such fluid ends have many parts that are releasably fastened to one another so that they can be repaired or replaced. These fluid ends experience large amounts of internal stresses from turbulent flows and cavitation as the fracture fluids pass therethrough. By the nature of its operation, a reciprocating pump or fluid end induces turbulent flow and cavitation into the system. These effects can be detrimental to the entire pumping system. These stresses can reduce the life of the fluid end and its internal components.

More particularly, in the fluid end, fracture fluids flow past a suction valve assembly and a discharge valve assembly. Each valve assembly including a valve seat and a valve head assembly. Traditional valve head assemblies have a poppet body from which extends one or more legs. The valve body provides the sealing surface for engaging a valve seat. In this regard, prior art valve bodies tend to be disk shaped with a substantially flat upper surface and a substantially flat lower surface that together define an outer peripheral edge, wherein the disk-shaped surfaces minimize fluid turbulence. A seal is typically attached adjacent about the outer peripheral edge. The legs of the seat assembly are utilized to maintain the orientation of the valve body during operation of the valve. A number of issues can arise with conventional valve head assemblies. The legs can impede flow through the valve. Moreover, the legs can induce turbulence in the flow as fluid flows past the valve head assembly. Such turbulence can increase abrasion and shorten the operation life of the various components of the valve assembly.

BRIEF DESCRIPTION OF THE DRAWINGS

For a detailed description of exemplary embodiments, reference will now be made to the accompanying drawings in which:

FIG. 7b is a magnified view of Section A of the valve body as indicated in FIG. 7a.

While the disclosure is susceptible to various modifications and alternative forms, specific embodiments thereof have been shown by way of example in the drawings and are herein described in detail. It should be understood, however, that the description herein of specific embodiments is not intended to limit the disclosure any particular form, but on the contrary, the intention is to cover all modifications, equivalents, and alternatives falling within the spirit and scope of the disclosure as set forth herein.

DETAILED DESCRIPTION OF THE EMBODIMENTS

Generally described herein is a valve head assembly for the fluid end of a hydraulic fracturing pump, wherein the valve head assembly is generally formed of a valve body with a valve step extending from the valve body and three or more legs extending from the valve stem. In one or more embodiments, each leg has a first leg segment and a second leg segment. The first leg segment attaches to a lower portion of the valve stem and extends at an angle back toward an upper portion of the valve stem. The second leg segment is attached an end of the first leg segment and is substantially parallel with the valve stem. In one or more embodiments, the valve body is disk shaped and has an outer annular flange positioned above the primary upper surface of the valve body to permit a seal of enhanced thickness to be attached about the peripheral edge of the valve body.

Figure 1:
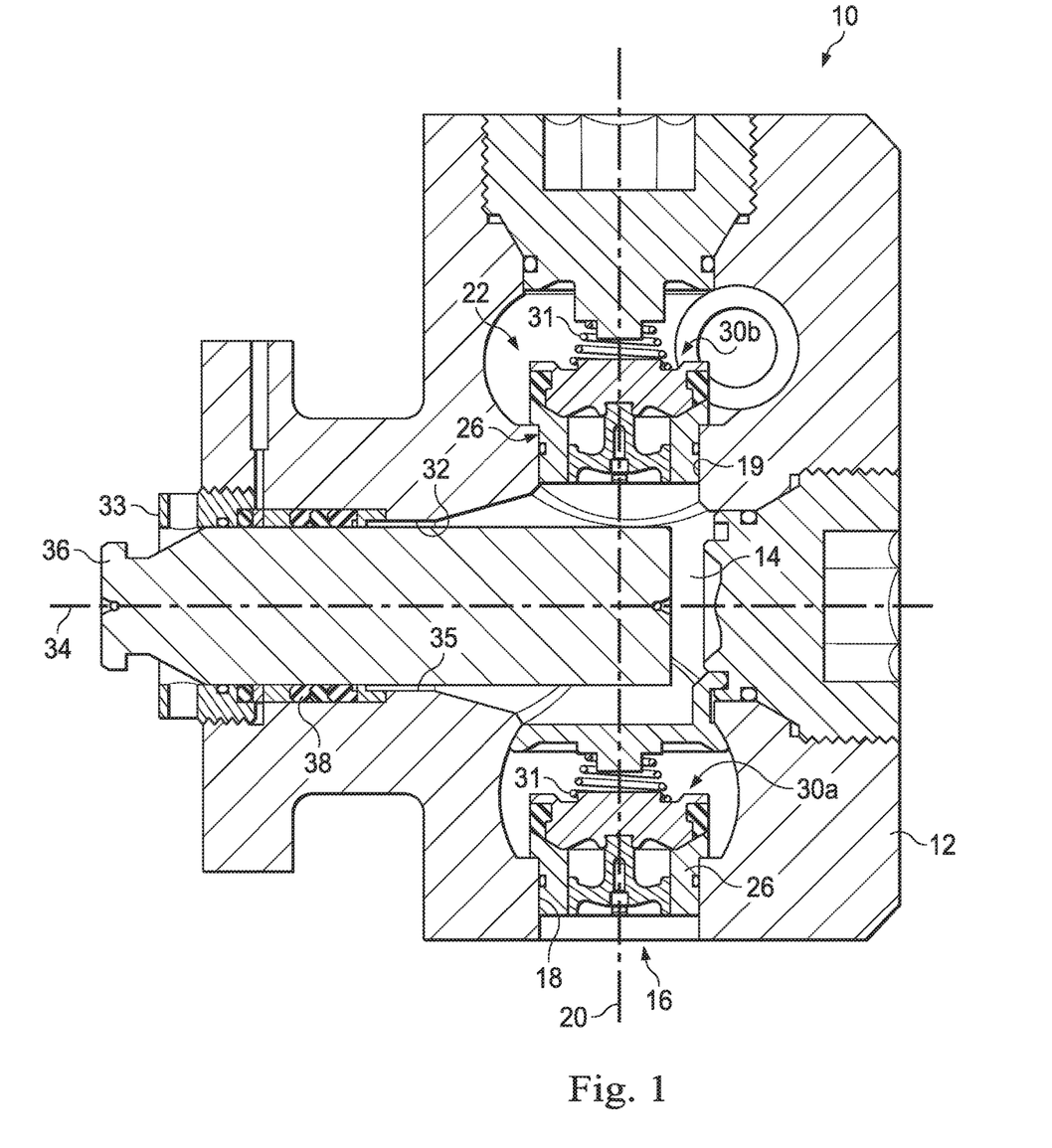
FIG. 1 is a side section view of a fluid end having valve head assemblies disposed therein in accordance with some embodiments.

Referring initially to FIG. 1, a side section view of a fluid end portion 10 of a reciprocating pump is shown. In one or more embodiments, the reciprocating pump may be a hydraulic fracturing pump. Fluid end 10 generally includes a housing 12 for attachment to the reciprocating pump (not shown) and also for attachment of inlet and outlet fluid hoses (not shown) as is well known in the industry. Defined within housing 12 is a pressure chamber 14. Pressure chamber 14 includes a first or suction end 16 for drawing fluid into fluid end 10. In one or more embodiments, suction end 16 may enable vacuum-induced intake of hydraulic fracturing fluid from a storage tank or other supply source (not shown). An intake bore 18 is formed in pump housing 12 at suction end 16 generally about axis 20 for communicating fluid flow to pressure chamber 14. Pressure chamber 14 further includes a second or discharge end 22 for discharge of fluid from fluid end 10. In one or more embodiments, discharge end 22 may enable pressurized discharge of hydraulic fracturing fluid for injection into a treatment well (not shown). A discharge bore 19 is formed in pump housing 12 at discharge end 22, which, in some embodiments, may also be disposed about axis 20 for communicating fluid flow from pressure chamber 14.

Each of suction end 16 and discharge end 22 include a valve seat 26 disposed in their respective bores 18, 19. Each valve seat 26 is disposed for receipt of a valve head assembly 30 that is urged into sealing contact with its respective valve seat 26 by a valve spring 31. In the illustrated embodiment, valve head 30 is disposed in the intake bore 18 as suction valve head assembly 30a and a valve head 30 is disposed in the discharge bore 19 as discharge valve head assembly 30b.

Pressure chamber 14 further includes a plunger bore 32 formed generally about plunger axis 34 and having a first end 33 and a second end 35, where second end 35 intersects with pressure chamber 14. In one or more embodiments, plunger axis 34 may be disposed at approximately a 90° angle relative to axis 20. This enables a reciprocating plunger 36 disposed in the first end 33 of plunger bore 32 to effect a change in fluid volume in pressure chamber 14 in order to create suction and discharge pressure within fluid end 10. A packing stack 38 is provided around plunger 36 to seal plunger bore 32.

Figure 2:
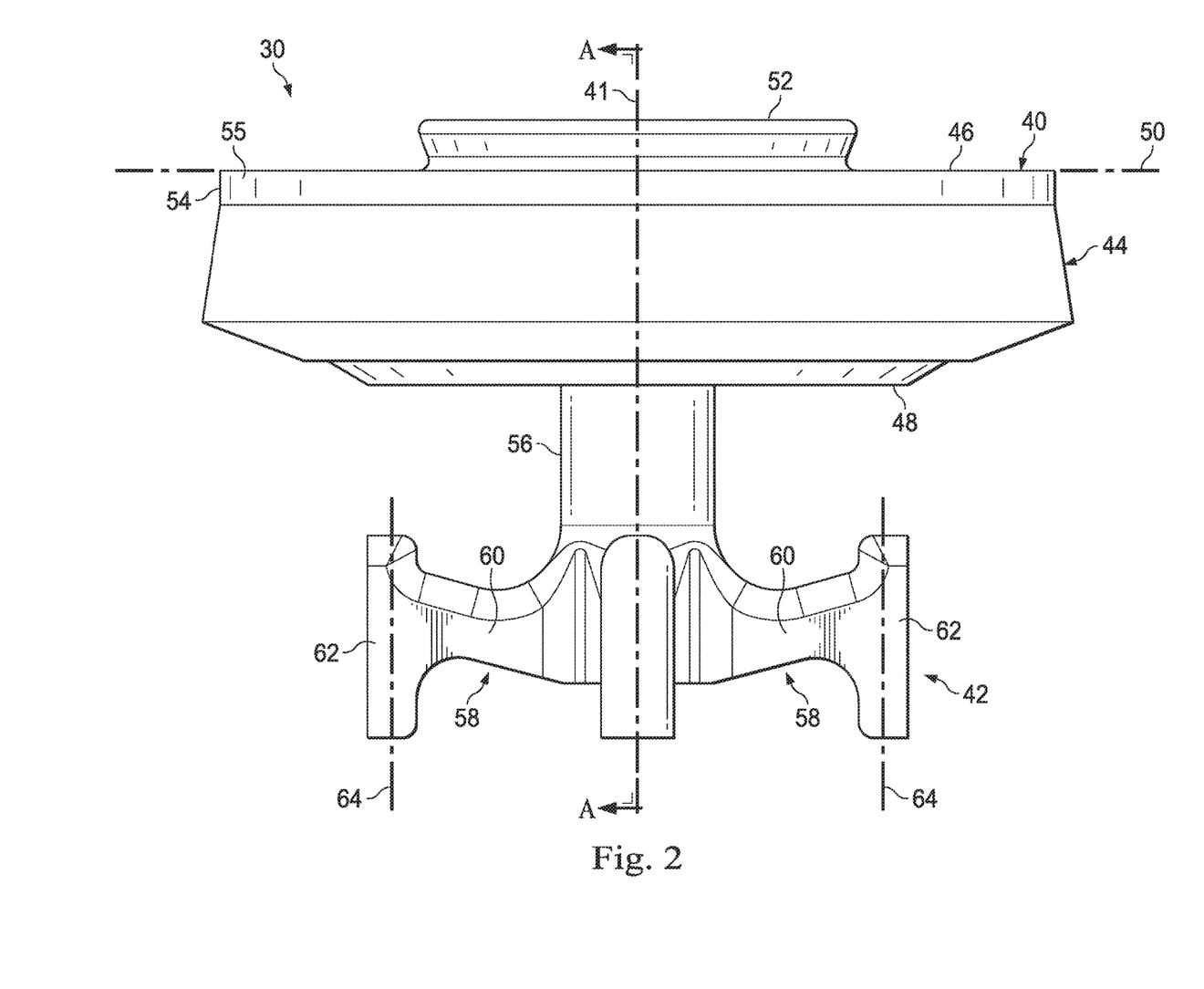
FIG. 2 is a side elevation view of a valve head assembly in accordance with some embodiments.

Referring now to FIG. 2, a side elevation view of a valve head assembly 30 is shown in more detail. Valve head assembly 30 generally includes a poppet or valve body 40 which is disk shaped about a main axis 41 and to which is attached a valve leg assembly 42. A seal 44 may be provided about the valve body 40. Valve body 40 has an upper surface 46 and a lower surface 48. An outer peripheral edge 66 of valve body 40 is defined between upper surface 46 and lower surface 48. Upper surface 46 may be generally flat and primarily extends in an upper surface plane 50.

Formed along upper surface 46, at the outer peripheral edge of valve body 40, is a flat annular rim 55. Annular rim 55 has a top surface 46 and a bottom surface 48, where the top surface 46 is substantially coplanar with upper surface plane 50. Outer peripheral edge 66 includes an upper side edge 54 formed adjacent upper surface 46 between the top surface 46 and bottom surface 48 of annular rim 55. Although the embodiment of FIG. 2 is not limited to a particular shape of valve body 40, in one or more embodiments, upper surface 46, including top surface 46, may be generally flat between main axis 41 and upper side edge 54.

In one or more embodiments, a spring mounting feature 52 may be formed on upper surface 46 about main axis 41, spaced apart from upper side edge 54. In one or more embodiments, spring mounting feature 52 may be a circular head extending from upper surface 46.

Valve leg assembly 42 is attached to valve body 40 adjacent the lower surface 48 of valve body 40. In the illustrated embodiment, valve leg assembly 42 includes a main shaft 56 from which at least two legs 58 extend. In one or more embodiments, legs 58 are mounted on main shaft 56 spaced apart from lower surface 48 of valve body 40 so as to minimize impedance of flow adjacent valve body 40. Each leg 58 has a first or inner leg segment 60 and a second or outer leg segment 62. Inner leg segment 60 extends radially outward from main shaft 56. In one or more embodiments, outer leg segment 62 extends along an outer leg axis 64 that is generally parallel with main axis 41. Although leg segments 60, 62 are shown as generally linear, in other embodiments, one or both leg segments 60, 62 may have other shapes. For example, in one or more embodiments, outer leg segment 62 may be curvilinear.

Figure 3:
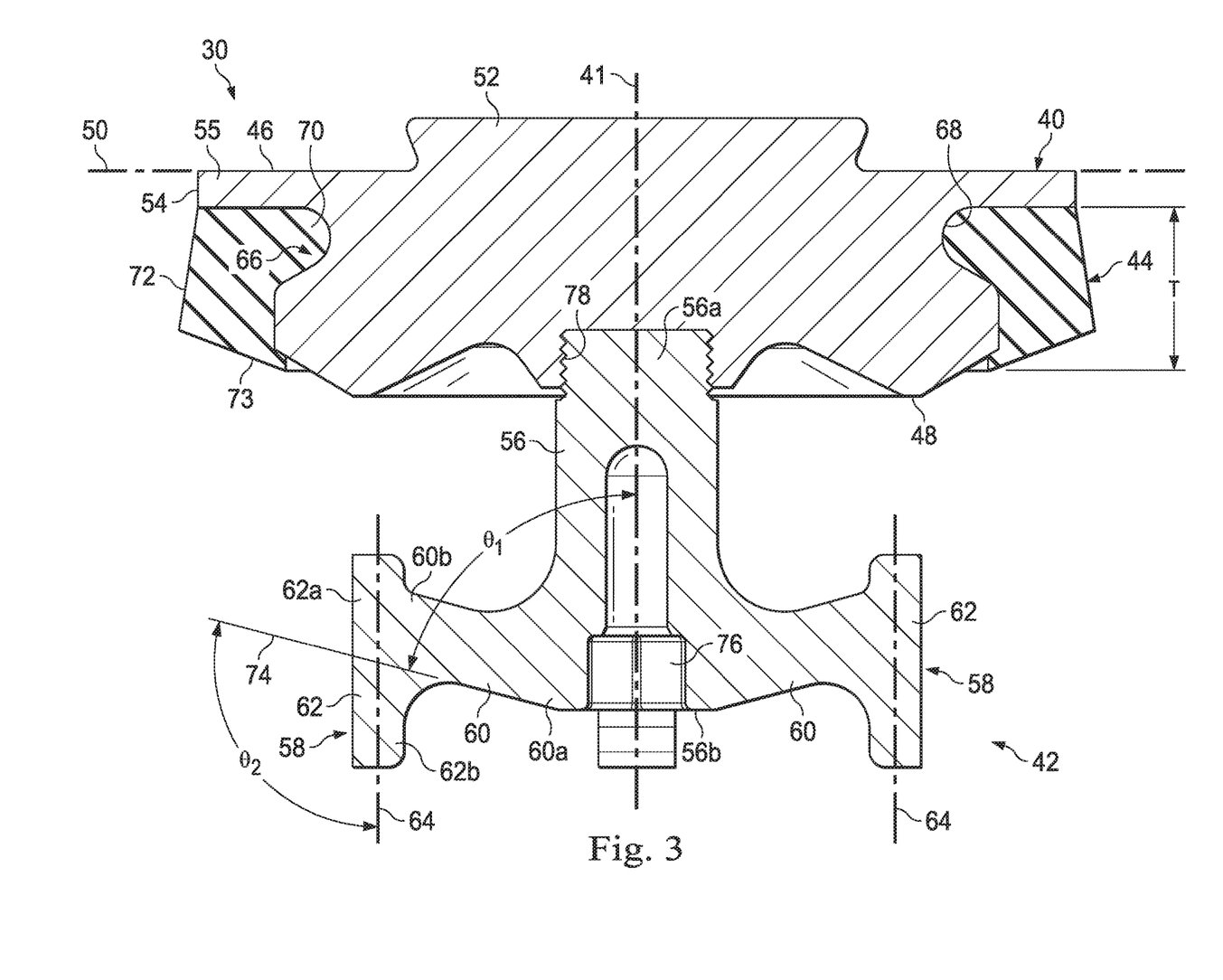
FIG. 3 is a side section view of a valve body in accordance with some embodiments.

Turning to FIG. 3, a cross-section of valve head assembly 30 is shown to better illustrate the embodiment of valve leg assembly 42 shown in FIG. 2.

Valve leg assembly 42 includes a main shaft 56 which generally extends from a first end 56a to a second end 56b. Legs 58 are attached to main shaft 56 at a location spaced apart from first end 56a. In one or more embodiments, legs 58 are attached to main shaft 56 adjacent to second end 56b. First end 56a of main shaft 56 may be threaded.

As described above, each leg 58 has a first or inner leg segment 60 and a second or outer leg segment 62, where outer leg segment 62 may extends along an outer leg axis 64 that is generally parallel with main axis 41. Moreover, inner leg segment 60 extends radially outward from main shaft 56. In one or more embodiments, inner leg segment 60 has a first end 60a and a second end 60b and extends along a first leg segment axis 74. The first end 60a of the first leg segment 60 attaches to the main shaft 56 and first leg segment 60 extends back towards the first end 56a the main shaft 56. In this regard, first leg segment axis 74 is angled back towards the first end 56a of main shaft 56 so as to form an angle θ1 between the main axis 41 and the first leg segment axis 74. In one or more embodiments, angle θ1 is between 0 and 90 degrees. In one or more embodiments, angle θ1 is between approximately 10 and 60 degrees. In any event, in one or more embodiments, the first end 60a of first leg segment 60 attaches to main shaft 56 adjacent the second end 56b of main shaft 56. In other embodiments, the first end 60a of first leg segment 60 attaches to main shaft 56 between the first end 56a and the second end 56b of main shaft 56.

Moreover, second leg segment 62 has a first end 62a and a second end 62b and extends along second leg segment axis 64. The second end 60b of the first leg segment 60 attaches to the second leg segment 62 so as to form an angle θ2 between the first leg segment axis 74 and the second leg segment axis 64. In one or more embodiments, angle θ1 is between 0 and 90 degrees. In one or more embodiments, angle θ1 is between approximately 10 and 60 degrees. Thus, in some embodiments, angle θ1 is the same as angle θ2. In any event, the second end 60b of first leg segment 60 attaches to second leg segment 62 at a point along its length to form angle θ2. In some embodiments, the second end 60b of first leg segment 60 attaches to second leg segment 62 adjacent the first end 62a of second leg segment 62. In yet other embodiments, the second end 60b of first leg segment 60 attaches to second leg segment 62 spaced apart from the ends 62a, 62b. Finally, in some embodiments, the second end 60b of first leg segment 60 attaches to second leg segment 62 adjacent the second end 62b of second leg segment 62.

In one or more embodiments, where first end 56a of main shaft 56 is threaded, main shaft 56 may further include a bore or cavity 76 formed in the second end 56b of main shaft 56 along main axis 41. Bore or cavity 76 may be shaped to receive a tool (not show) for manipulating valve leg assembly 42. For example, bore 76 may be hexagonal in shape for receipt of a hexagonally shaped tool (not shown).

With respect to valve body 40, as can be seen in FIG. 3, upper surface 46 may be substantially flat and parallel with upper surface plane 50 extending out to upper side edge 54 so to form a flat annular rim 55. As illustrated, upper side edge 54 forms a portion of an outer peripheral edge 66 of valve body 40 between upper surface 46 and a lower surface 48.

In one or more embodiments, a spring mounting feature 52 may be formed on upper surface 46 about main axis 41, spaced apart from upper side edge 54.

Outer peripheral edge 66 may be shaped to secure annular seal 44 about valve body 40. For example, in the illustrated embodiment, outer peripheral edge 66 includes a notch 68 formed therealong which may receive a protrusion 70 formed along a portion of the inner diameter of annular seal 44. Although annular seal 44 may have many shapes and is not intended to limit the embodiments of FIGS. 2 and 3, in one or more embodiments, annular seal 44 abuts the bottom surface 48 of annular rim 55. In one or more embodiments, annular seal 44 may overlay upper side edge 54 just as it overlays a large portion of outer peripheral edge 66 in the figures. In other embodiments, such as is shown in FIGS. 2 and 3, annular seal 44 may have an outer peripheral surface 72 that intersects upper side edge 54 of valve body 40, while in other embodiments, annular rim 55 may extend out over annular seal 44 such that. In all cases, rim 55 extends out over at least a portion of annular seal 44 and protects annular seal 44. Annular seal 44 may be characterized by an axial thickness T between the bottom surface 48 of annular rim 55 and a lower surface 73 of seal 44. In the illustrated embodiment, lower surface 73 of seal 44 intersects with lower surface 48 of valve body 40.

Valve leg assembly 42 may be integrally formed with valve body 40 or may be separately formed. Traditionally in the prior art, valve bodies are integrally formed with their valve legs. In the illustrated embodiments of FIG. 3, valve leg assembly 42 is separately formed. In such embodiments, valve body 40 may include a threaded bore 78 formed in lower surface 48 about main axis 41. Threaded bore 78 is disposed for receipt of threaded end 56a of main shaft 56. It will be appreciated that bore 76 of main shaft 56 may receive a tool (not shown) in order to aid in attachment of valve leg assembly 42 to valve body 40.

Figure 4:
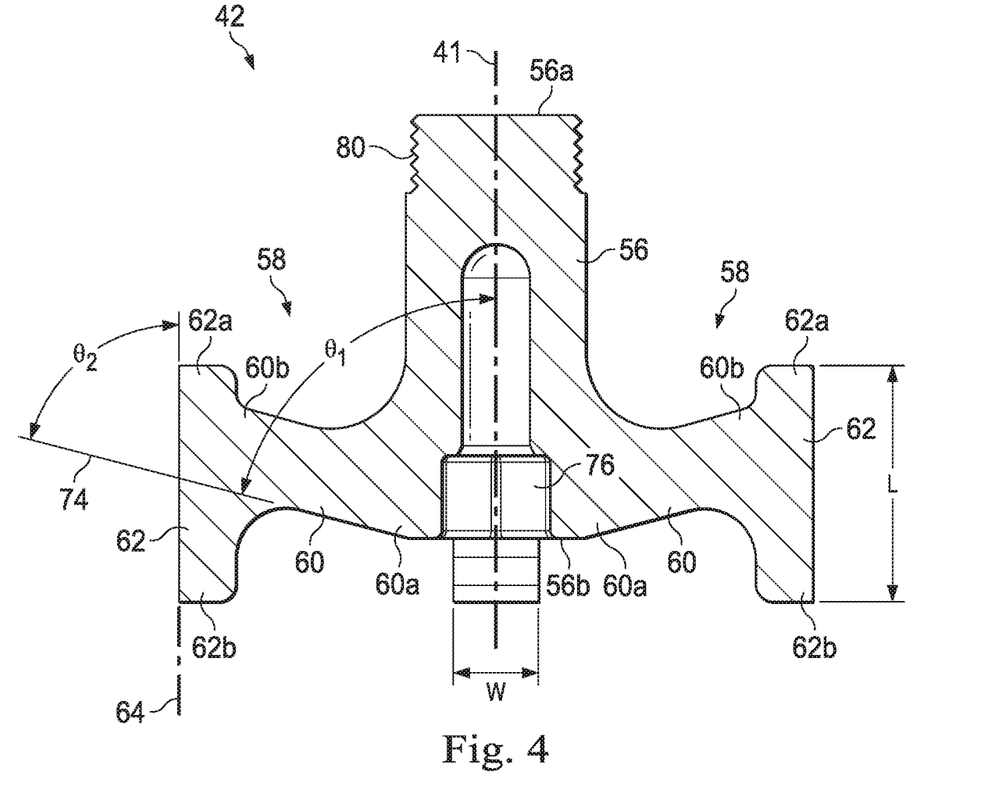
FIG. 4 is a side section view of valve legs in accordance with some embodiments.

Turning to FIG. 4, valve leg assembly 42, and in particular, the backward swept or delta shaped nature of the legs 58 are illustrated. As shown, inner leg segment 60 is generally formed along inner leg axis 74, while outer leg segment 62 is generally formed along outer leg axis 64. In one or more, the first end 60a of inner leg segment 60 attaches to main shaft 56 adjacent the second end 56b and is angled backward by an angle of θ1 towards the first end 56a of main shaft 56 relative to main axis 41. The second end 60b of inner leg segment 60 attaches to outer leg segment 62. In one or more embodiments, outer leg axis 64, as well as outer leg segment 62, is generally parallel with main axis 41, such that inner leg segment 60 and outer leg segment 62 when attached to one another form a "V" shape, giving rise to the overall delta shaped nature of legs 58 when attached to main shaft 56.

In any event, in one or more embodiments, second end 60b of inner leg segment 60 attaches adjacent the first end 62a of outer leg segment 62. The length L of each outer leg segment 62 may be selected so that the second end 62b of out leg segment 62 extends past the second end 56a of main shaft 56. Each outer leg segment 62 may also be characterized by a width W.

While the above described leg assembly 42 may be integrally formed with a valve body (not shown), in one or more embodiments, leg assembly 42 may be separately formed and thereafter attached to a valve body. Thus, the first end 56a of main shaft 56 may include threads 80 more mating with a threaded valve body bore (not shown).

Figure 5A:
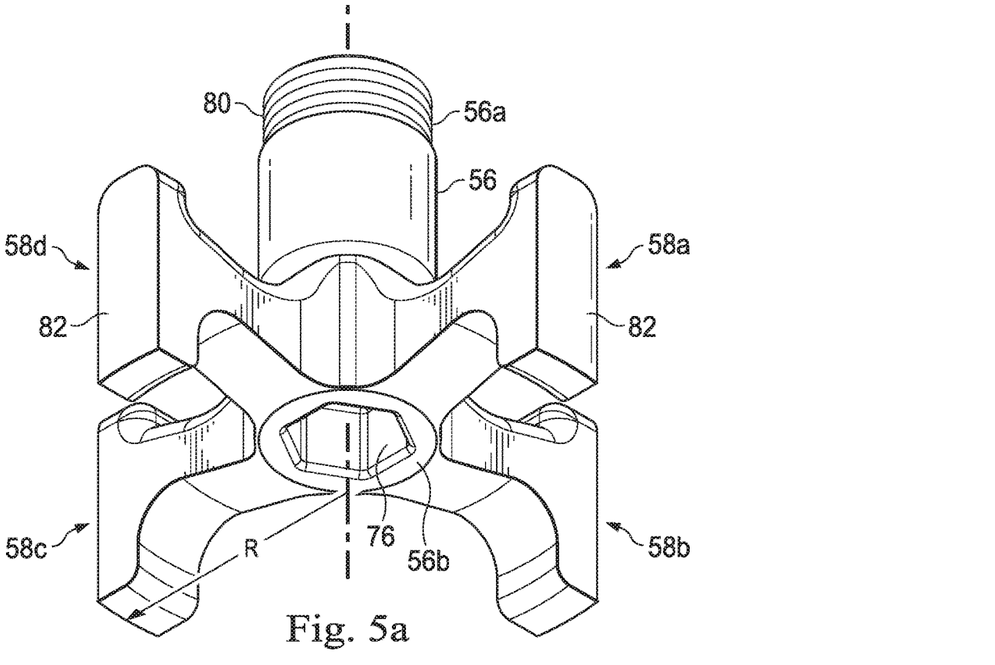
FIGS. 5A and 5B are perspective views of valve legs in accordance with some embodiments.
Figure 5B:
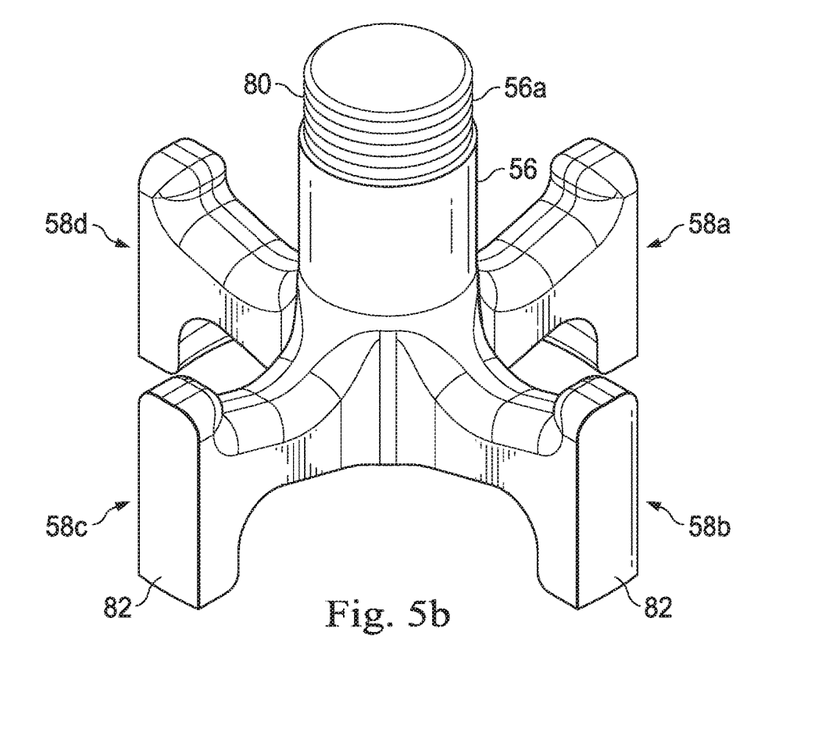

FIGS. 5a and 5b are perspective views of leg assembly 42, with FIG. 5a showing a bottom perspective view and FIG. 5b showing a top perspective view. In the illustrated embodiments, leg assembly 42 has four legs 58, namely legs 58a, 58b, 58c and 58d. As shown, legs 58a, 58b, 58c and 58d are symmetrically spaced equidistance from one another about main shaft 56. In one or more embodiments, each outer leg segment 62 may include an outer surface 82. The outer surface 82 of an outer leg segment 62 may be substantially flat in some embodiments, while in other embodiments, outer surface 62 may be rounded, such as by a radius R across the width W of outer leg segment 62. In the illustrated embodiments, main shaft 56 has threads 80 at first end 56a and a bore 76 at second end 56b. In the illustrated embodiment, bore 76 is hexagonal in shape.

Figure 6:
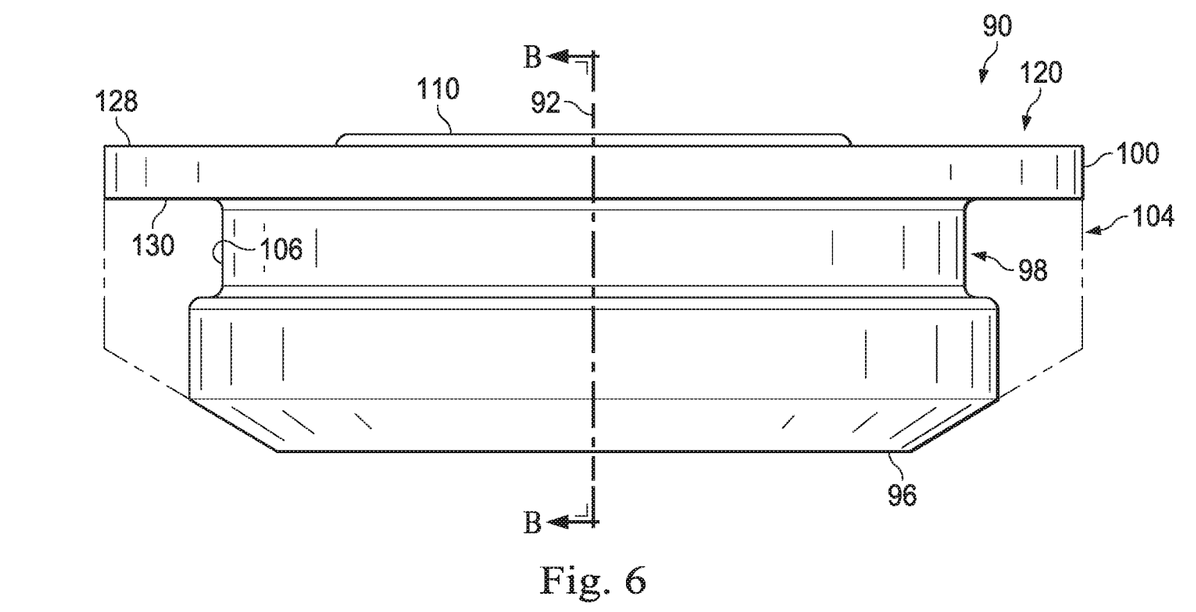
FIG. 6 is a side elevation view of another embodiment of a valve body in accordance with some embodiments.
Figure 7A:
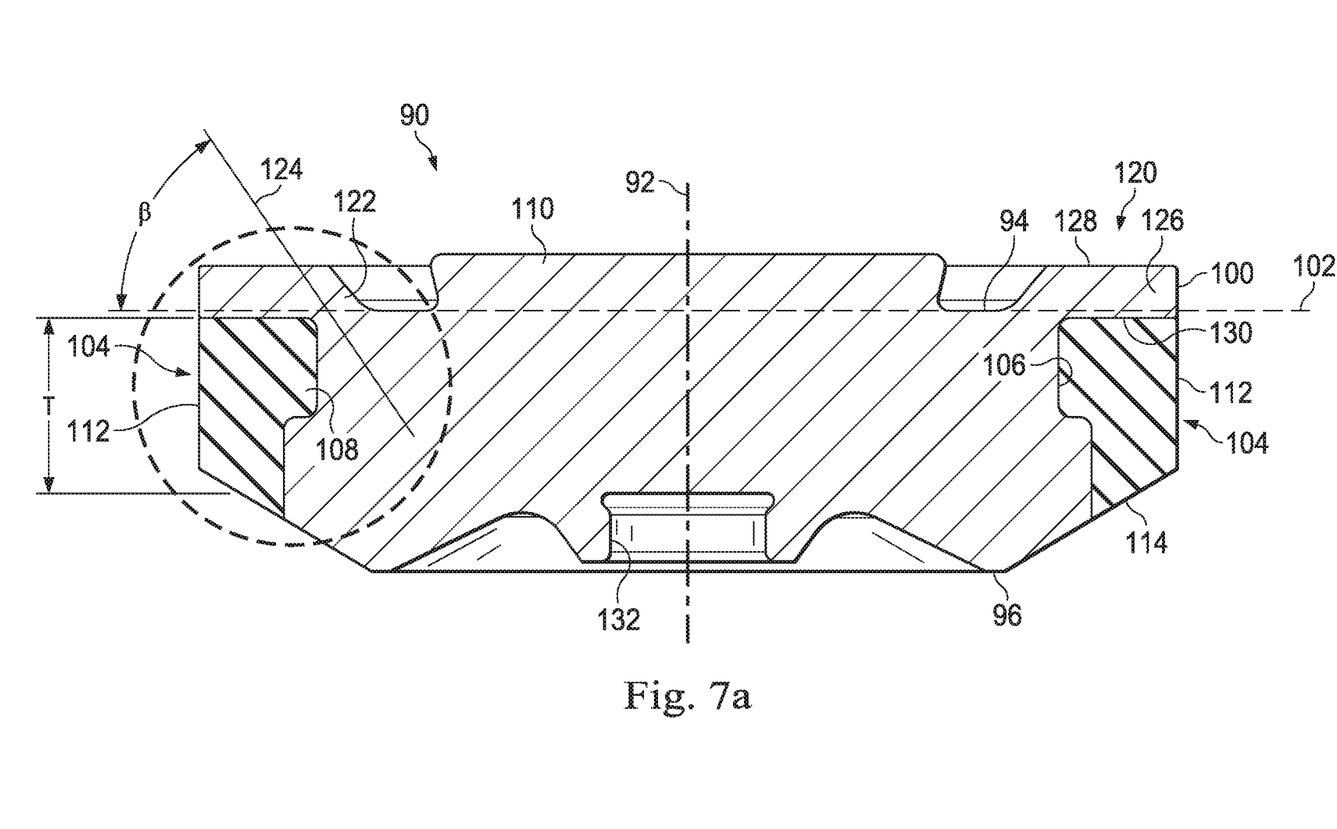
FIG. 7a is a side section view of the valve body of FIG. 6.
Figure 7B:
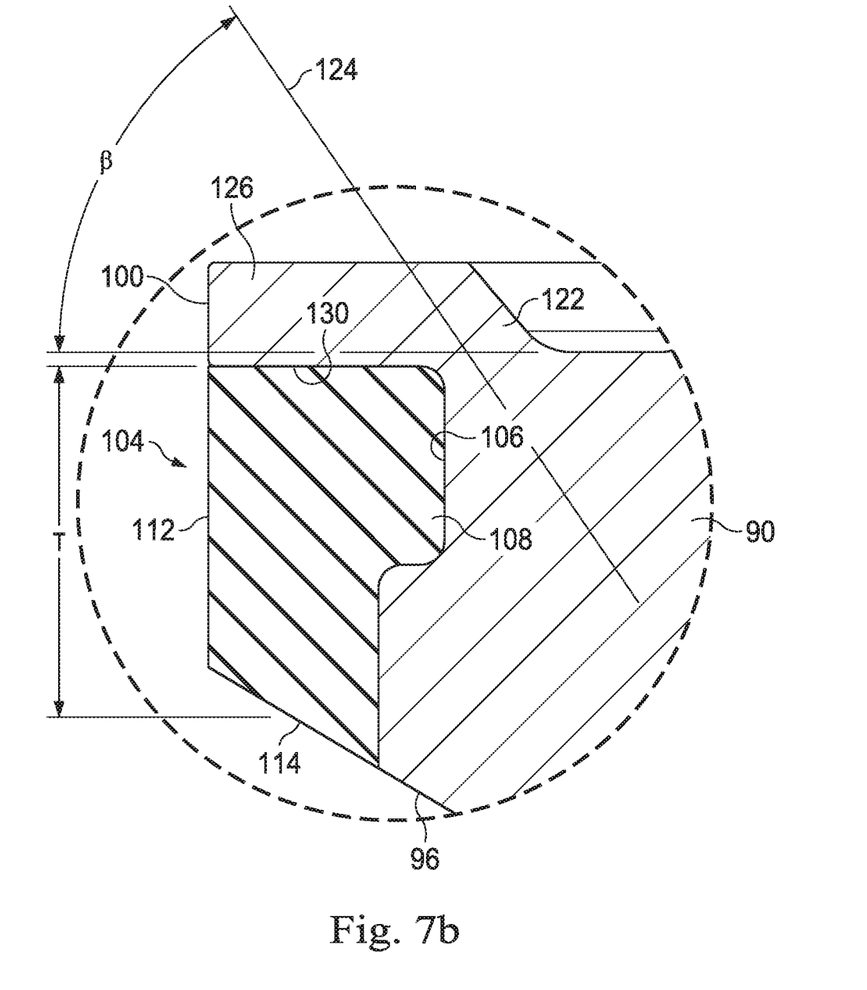

Turning to FIGS. 6, 7a and 7b, a valve body 90 is shown. Valve body 90 is generally disk shaped about a main axis 92. Valve body 90 has an upper surface 94 and a lower surface 96. Valve body 90 also includes an outer peripheral edge 98 defined between upper surface 94 and lower surface 96 which outer peripheral edge 98 includes an upper side edge portion 100. Upper surface 94 generally may be flat and primarily extends in an upper surface plane 102. An annular seal 104 is provided about at least a portion of outer peripheral edge 98. In this regard, outer peripheral edge 98 may be shaped to secure annular seal 104. In the illustrated embodiment, outer peripheral edge 98 includes a notch 106 formed which may receive a protrusion 108 formed along a portion of the inner diameter of annular seal 104.

A spring mounting feature 110 may be formed on upper surface 94 about main axis 92. In one or more embodiments, spring mounting feature 110 may be a circular head extending from upper surface 94.

Although annular seal 104 may have many shapes and is not intended to limit the embodiments of FIGS. 6, 7a and 7b, in one or more embodiments, annular seal 104 may overlay upper side edge portion 100. In other embodiments, such as is shown in FIGS. 6, 7a and 7b, annular seal 104 may have an outer peripheral surface 112 that intersects upper side edge portion 100 of outer peripheral edge 98. Annular seal 104 is characterized by an axial thickness T. In the illustrated embodiment, lower surface 114 of annular seal 104 intersects with lower surface 96 of valve body 90.

Also formed along upper surface 96, at the outer peripheral edge of valve body 90, is a raised annular rim 120 extending above upper surface plane 102. Raised annular rim 120 may be gull wing shaped and generally formed of i) an extension ring 122 extending upward from upper surface plane 102 along an axis 124, and (ii) an annular flange 126 extending out from extension ring 122. Annular flange 126 has a top surface 128 and a bottom surface 130, where the top surface 128 may be substantially parallel with, but spaced axially apart from upper surface plane 102. In one or more embodiments, bottom surface 130 may be coplanar with upper surface plane 102. An angle β is formed between extension ring axis 124 and upper surface plane 102. In one or more embodiments, p is greater than zero degrees and less than 90 degrees. In one or more embodiments, p is greater between 25 degrees and 75 degrees, thereby creating the above-referenced gull wing shape. However, in other embodiments, may be 90 degrees, such that extension ring 122 is substantially perpendicular to upper surface 94 and upper surface plane 102. In still yet other embodiments, β is simply greater than 10 degrees such that extension ring 122 is angled relative to upper surface plane 102.

In one or more embodiments, valve body 90 may also include an attachment bore 132 formed in lower surface 96 about main axis 92. Attachment bore 132 is disposed for receipt of a leg assembly, such as leg assembly 42 shown in FIG. 4. In one or more embodiments, attachment bore 132 may be threaded.

It will be appreciated that by employing the gull wing shaped flange 128 as described above, the thickness T of seal 104 may be increased over prior art seals, thus enhancing the durability of seal 104.

Thus, a valve head assembly has been described. Embodiments of a valve head assembly may generally include a valve body; and a valve leg assembly attached to the valve body, the valve leg assembly comprising a main leg shaft having a first end and a second end and extending along a main axis, and at least three legs extending from the main leg shaft, wherein the first end of the main leg shaft is attached to the valve body, wherein each leg has a first leg segment and a second leg segment, the first leg segment having a first end and a second end and extending along a first leg segment axis, wherein the first end of the first leg segment attaches to the main leg shaft and the first leg segment extends back towards the first end of the main leg shaft, the second leg segment having a first end and a second end and extending along a second leg segment axis, wherein the second end of the first leg segment attaches to the second leg segment and the second leg segment axis is substantially parallel with but spaced apart from the main axis. In other embodiments, the valve head assembly may include a disk shaped valve body having an upper surface and a lower surface with an outer peripheral edge formed between the upper and lower surfaces; a seal attached adjacent the outer peripheral edge; and a valve leg assembly, the valve leg assembly comprising a main leg shaft having a first end and a second end and extending along a main axis, and at least three legs extending from the main leg shaft, wherein the first end of the main leg shaft is attached to the valve body, wherein each leg has a first leg segment and a second leg segment, the first leg segment having a first end and a second end and extending along a first leg segment axis, wherein the first end of the first leg segment attaches to the main leg shaft adjacent the second end of the main leg shaft and the first leg segment extends back towards the first end of the main leg shaft so as to form an angle $\theta 1$ between the main axis and the first leg segment axis, wherein angle $\theta 1$ is between 0 and 90 degrees; the second leg segment having a first end and a second end and extending along a second leg segment axis, wherein the second end of the first leg segment attaches to the second leg segment so as to form an angle $\theta 2$ between the first leg segment axis and the second leg segment axis, wherein angle $\theta 2$ is between 0 and 90 degrees. In still yet other embodiments, the valve head assembly may include a valve body, wherein the valve body is disk shaped about a main axis and comprises an upper surface and a lower surface, with an outer peripheral edge formed between the upper and lower surfaces, wherein the upper surface of the valve body extends in an upper surface plane so as to be generally coplanar therewith, wherein the valve body further comprises an extension ring formed adjacent the upper surface at the outer peripheral edge; and an annular flange extending from the extension ring, wherein the annular flange extends in flange plane so as to be generally coplanar therewith, the flange plane being spaced apart from and above the upper surface plane; a seal attached adjacent the outer peripheral edge; and a valve leg assembly attached to the valve body, the valve leg assembly comprising a main leg shaft having a first end and a second end and extending along a main axis, and at least three legs extending from the main leg shaft, wherein the first end of the main leg shaft is attached to the valve body, wherein each leg has a first leg segment and a second leg segment, the first leg segment having a first end and a second end and extending along a first leg segment axis, wherein the first end of the first leg segment attaches to the main leg shaft and the first leg segment extends back towards the first end of the main leg shaft, the second leg segment having a first end and a second end and extending along a second leg segment axis, wherein the second end of the first leg segment attaches to the second leg segment and the second leg segment axis is substantially parallel with but spaced apart from the main axis. Finally, in other embodiments, the valve head assembly may include a valve body, wherein the valve body is disk shaped about a main axis and comprises an upper surface and a lower surface, which surfaces terminate at an outer peripheral edge; a valve leg assembly, the valve leg assembly comprising at least three legs extending from adjacent the lower surface of the valve body; and a seal attached adjacent the outer peripheral edge, wherein the upper surface extends in an upper surface plane so as to be generally coplanar therewith; wherein the valve body further comprises an extension ring formed adjacent the upper surface at the outer peripheral edge; and a annular flange extending from the extension ring, wherein the annular flange extends in flange plane so as to be generally coplanar therewith, the flange plane being spaced apart from and above the upper surface plane.

For any of the foregoing embodiments, the valve head assembly may include any one of the following elements, alone or in combination with each other:

Angle $\theta 1$ is between approximately 10 and 60 degrees.

Angle $\theta 2$ is between approximately 10 and 60 degrees.

Angle $\theta 1$ is the same as angle $\theta 2$.

The leg of the valve leg assembly is backward swept.

The leg of the valve leg assembly has a delta shape.

The valve body is disk shaped and comprises a upper surface and a lower surface that terminate at an outer peripheral edge.

The first end of the first leg segment attaches to the main leg shaft adjacent the second end of the main leg shaft.

The first end of the first leg segment attaches to the main leg shaft between the first end and the second end of the main leg shaft.

The main leg shaft further comprises an axially extending bore formed at the second end of the main leg shaft.

The legs extending from the main leg shaft are symmetrically spaced from one another about the main leg shaft.

The axially extending bore is hexagonal in shape.

The main leg shaft is threaded at the first end of the main leg shaft.

The valve leg assembly comprises four legs extending from the main leg shaft.

The first leg segment is linear and the second leg segment is linear.

The second leg segment is curvilinear.

The second leg segment is linear.

The second end of the first leg segment attaches to the second leg segment spaced apart from the first and second ends of the second leg segment.

The first leg segment extends back towards the first end of the main leg shaft so as to form an angle $\theta 1$ between the main axis and the first leg segment axis, wherein angle $\theta 1$ is between 0 and 90 degrees.

The annular flange has a gull wing shape.

The second end of the first leg segment attaches to the second leg segment so as to form an angle $\theta 2$ between the first leg segment axis and the second leg segment axis, wherein angle $\theta 2$ is between 0 and 90 degrees.

The valve body further comprises a threaded bore formed in the lower surface; and wherein the main leg shaft is threaded at the first end, wherein the threaded end of the main leg shaft engages the threaded bore of the valve body.

A valve leg assembly attached to the valve body, the valve leg assembly comprising a main leg shaft having a first end and a second end and extending along a main axis, and at least three legs extending from the main leg shaft, wherein the first end of the main leg shaft is attached to the valve body, wherein each leg has a first leg segment and a second leg segment, the first leg segment having a first end and a second end and extending along a first leg segment axis, wherein the first end of the first leg segment attaches to the main leg shaft and the first leg segment extends back towards the first end of the main leg shaft, the second leg segment having a first end and a second end and extending along a second leg segment axis, wherein the second end of the first leg segment attaches to the second leg segment and the second leg segment axis is substantially parallel with but spaced apart from the main axis.

The extension ring extends from the upper surface.

The extension ring extends from the peripheral edge.

The extension ring is inclined between the upper surface plane and the flange plane.

The extension ring is inclined between the upper surface plane and the flange plane at an angle β, wherein angle β is between 0 and 90 degrees.

The extension ring is inclined between the upper surface plane and the flange plane at an angle β, wherein angle β is between approximately 30 and 60 degrees.

The extension ring is inclined between the upper surface plane and the flange plane at an angle β, wherein angle β is approximately 45 degrees.

The annular flange has an upper surface, a lower surface and an outer peripheral surface, wherein the seal is disposed along the lower surface of the annular flange and adjacent at least a portion of the outer peripheral edge of the valve body.

The seal forms a ring about the outer peripheral edge of the body, the ring having outer ring surface and a lower ring surface.

A notch formed along the outer peripheral edge of the valve body and a protrusion formed along a portion of an inner diameter of seal, wherein the protrusion seats in the notch.

The seal forms a ring about the outer peripheral edge of the body, the ring having outer ring surface and a lower ring surface, wherein the outer ring surface is substantially flush with the outer peripheral surface of the annular flange.

The seal forms a ring about the outer peripheral edge of the body, the ring having outer ring surface and a lower ring surface, wherein the lower ring surface is substantially flush with a chamfered portion of the lower surface of the valve body.

The seal forms a ring about the outer peripheral edge of the body, the ring having outer ring surface and a lower ring surface, wherein the lower ring surface is inclined towards the body main axis.

The outer peripheral edge has a first diameter and the annular flange has a second diameter that is greater than the first diameter.

The outer peripheral edge adjacent the lower surface of the valve body has a first diameter and the annular flange has a second diameter that is greater than the first diameter.

The annular flange overhangs the outer peripheral edge of the valve body.

The first leg segment has a first end that attaches to the main leg shaft and extends along a first leg segment axis back towards the valve body.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed:

1. A valve head assembly comprising: a valve body; and a valve leg assembly attached to the valve body, the valve leg assembly comprising a main leg shaft having a first end and a second end and extending along a main axis, and at least three legs extending from the main leg shaft, wherein the first end of the main leg shaft is attached to the valve body, wherein each leg has a first leg segment and a second leg segment, the first leg segment having a first end and a second end and extending along a first leg segment axis, wherein the first end of the first leg segment attaches to the main leg shaft and the first leg segment extends back towards the first end of the main leg shaft, the second leg segment having a first end and a second end and extending along a second leg segment axis, wherein the second end of the first leg segment attaches to the second leg segment and the second leg segment axis is parallel with but spaced apart from the main axis.

2. The valve head assembly of claim 1, wherein the first leg segment extends back towards the first end of the main leg shaft so as to form an angle θ1 between the main axis and the first leg segment axis and wherein the angle θ1 is between 10 and 60 degrees.

3. The valve head assembly of claim 1, wherein the second end of the first leg segment attaches to the second leg segment so as to form an angle θ2 between the first leg segment axis and the second leg segment axis, wherein the angle θ2 is between 10 and 60 degrees.

4. The valve head assembly of claim 1, wherein the first leg segment extends back towards the first end of the main leg shaft so as to form an angle θ1 between the main axis and the first leg segment axis; wherein the second end of the first leg segment attaches to the second leg segment so as to form an angle θ2 between the first leg segment axis and the second leg segment axis; and wherein the angle θ1 is the same as the angle θ2.

5. The valve head assembly of claim 1, wherein the first leg segment is linear and the second leg segment is linear.

6. The valve head assembly of claim 1, wherein the second leg segment is curvilinear.

7. The valve head assembly of claim 1, wherein main leg shaft is threaded at the first end.

8. The valve head assembly of claim 7, wherein the valve body is disk shaped and comprises a upper surface and a lower surface that terminate at an outer peripheral edge formed therebetween, with a threaded bore formed in the lower surface, wherein the threaded end of the main leg shaft engages the threaded bore of the valve body.

9. The valve head assembly of claim 1, wherein a bore is formed in the main leg shaft at the second end.

10. The valve head assembly of claim 1, wherein the at least three legs comprises four legs extending from the main leg shaft.

11. The valve head assembly of claim 10, wherein the four legs extending from the main leg shaft are symmetrically spaced from one another about the main leg shaft.

12. The valve head assembly of claim 1, wherein the valve body is disk shaped and comprises a upper surface and a lower surface that terminate at an outer peripheral edge formed therebetween; and a seal attached adjacent the outer peripheral edge, wherein the upper surface of the valve body extends in an upper surface plane, the valve body further comprising an extension ring formed adjacent the upper surface at the outer peripheral edge; and an annular flange extending from the extension ring, wherein the annular flange extends in a flange plane, the flange plane being spaced apart from and above the upper surface plane.

13. The valve head assembly of claim 12, wherein the annular flange has an upper surface, a lower surface and an outer peripheral surface, wherein the seal is disposed along the lower surface of the annular flange and adjacent at least a portion of the outer peripheral edge of the valve body.

14. A valve head assembly comprising: a disk shaped valve body having an upper surface and a lower surface with an outer peripheral edge formed between the upper and lower surfaces; a seal attached adjacent the outer peripheral edge; and a valve leg assembly, the valve leg assembly comprising a main leg shaft having a first end and a second end and extending along a main axis, and at least three legs extending from the main leg shaft, wherein the first end of the main leg shaft is attached to the valve body, wherein each leg has a first leg segment and a second leg segment, the first leg segment having a first end and a second end and extending along a first leg segment axis, wherein the first end of the first leg segment attaches to the main leg shaft adjacent the second end of the main leg shaft and the first leg segment extends back towards the first end of the main leg shaft so as to form an angle $\theta 1$ between the main axis and the first leg segment axis, wherein the angle $\theta 1$ is between 0 and 90 degrees; the second leg segment having a first end and a second end and extending along a second leg segment axis, wherein the second end of the first leg segment attaches to the second leg segment so as to form an angle $\theta 2$ between the first leg segment axis and the second leg segment axis, wherein the angle $\theta 2$ is between 0 and 90 degrees.

15. The valve head assembly of claim 14, wherein the angle $\theta 1$ is between 10 and 60 degrees.

16. The valve head assembly of claim 14, wherein the second end of the first leg segment attaches to the second leg segment spaced apart from the first and second ends of the second leg segment.

17. The valve head assembly of claim 14, wherein the main leg shaft further comprises a cavity formed at the second end of the main leg shaft.

18. The valve head assembly of claim 14, wherein the valve body further comprises a threaded bore formed in the lower surface; and wherein the main leg shaft is threaded at the first end, wherein the threaded end of the main leg shaft engages the threaded bore of the valve body.

19. A valve head assembly comprising: a valve body, wherein the valve body is disk shaped about a main axis and comprises an upper surface and a lower surface, with an outer peripheral edge formed between the upper and lower surfaces, wherein the upper surface of the valve body extends in an upper surface plane, wherein the valve body further comprises an extension ring formed adjacent the upper surface at the outer peripheral edge; and an annular flange extending from the extension ring, wherein the annular flange extends in a flange plane, the flange plane being spaced apart from and above the upper surface plane; a seal attached adjacent the outer peripheral edge; and a valve leg assembly attached to the valve body, the valve leg assembly comprising a main leg shaft having a first end and a second end and extending along the main axis, and at least three legs extending from the main leg shaft, wherein the first end of the main leg shaft is attached to the valve body, wherein each leg has a first leg segment and a second leg segment, the first leg segment having a first end and a second end and extending along a first leg segment axis, wherein the first end of the first leg segment attaches to the main leg shaft and the first leg segment extends back towards the first end of the main leg shaft, the second leg segment having a first end and a second end and extending along a second leg segment axis, wherein the second end of the first leg segment attaches to the second leg segment and the second leg segment axis is parallel with but spaced apart from the main axis.

20. The valve head assembly of claim 19, wherein the extension ring is inclined between the upper surface plane and the flange plane at an angle $\beta$, wherein the angle $\beta$ is between 30 and 60 degrees.

\* \* \* \* \*